US007841012B2

(12) United States Patent
Huang

(10) Patent No.: US 7,841,012 B2
(45) Date of Patent: Nov. 23, 2010

(54) METHOD AND SYSTEM FOR PROCESSING MULTICAST SERVICES

(75) Inventor: Xiaofeng Huang, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 733 days.

(21) Appl. No.: 11/826,904

(22) Filed: Jul. 19, 2007

(65) Prior Publication Data

US 2008/0040815 A1 Feb. 14, 2008

Related U.S. Application Data

(63) Continuation of application No. PCT/CN2006/000084, filed on Jan. 19, 2006.

(30) Foreign Application Priority Data

Jan. 19, 2005 (CN) .................... 2005 1 0032912

(51) Int. Cl.
*G06F 7/04* (2006.01)
(52) U.S. Cl. .............................. 726/28; 726/2; 713/153
(58) Field of Classification Search ............... 726/2–10, 726/16–21, 26–30; 713/150–153, 162–163, 713/168–170, 182; 380/200–203, 247, 255–257
See application file for complete search history.

(56) References Cited

U.S. PATENT DOCUMENTS

| 5,295,266 | A | * | 3/1994 | Hinsley et al. ............... 718/101 |
| 5,778,187 | A | * | 7/1998 | Monteiro et al. ............. 709/231 |
| 5,867,646 | A | * | 2/1999 | Benson et al. ................. 726/4 |
| 5,968,177 | A | * | 10/1999 | Batten-Carew et al. ........ 726/4 |

(Continued)

FOREIGN PATENT DOCUMENTS

CN     1 540 920 A     10/2004

(Continued)

OTHER PUBLICATIONS

Foreign communication from a counterpart application, PCT application PCT/CN2006/000084, English translation Written Opinion dated Apr. 27, 2006, 4 pages.

(Continued)

*Primary Examiner*—Kimyen Vu
*Assistant Examiner*—Darren Schwartz
(74) *Attorney, Agent, or Firm*—Conley Rose, P.C.; Grant Rodolph

(57) ABSTRACT

A method and a system for processing multicast services, binding each user to a default profile for separately configuring the authority over programs for the user and a right suite profile which prefabricates combination of programs and authority, directly forwarding a program to the superuser; for a non-superuser, acquiring authority over the program by traversing all profiles to which the user is bound, not forwarding the program if the user does not have the authority over the program; if the user has the authority over the program, forwarding a program stream to the user in the case that the program stream has been forwarded to the multicast service processing system. By the invention, the flexibility of multicast service processing is improved, individualized services of a user are implemented. The invention also provides a mode for processing a superuser, which provides real highly efficient and convenient privilege processing to the superuser.

16 Claims, 3 Drawing Sheets

U.S. PATENT DOCUMENTS

| | | | |
|---|---|---|---|
| 6,412,070 B1 * | 6/2002 | Van Dyke et al. | 726/17 |
| 6,501,957 B2 | 12/2002 | Muhonen et al. | |
| 6,766,457 B1 * | 7/2004 | Baisley | 726/6 |
| 7,185,047 B1 * | 2/2007 | Bate et al. | 709/202 |
| 7,191,332 B1 * | 3/2007 | Pankajakshan et al. | 713/163 |
| 2002/0048369 A1 * | 4/2002 | Ginter et al. | 380/277 |
| 2003/0195855 A1 * | 10/2003 | Parks et al. | 705/51 |
| 2003/0233540 A1 * | 12/2003 | Banerjee et al. | 713/153 |
| 2004/0024013 A1 | 2/2004 | Asai | |
| 2005/0086501 A1 * | 4/2005 | Woo et al. | 713/189 |
| 2005/0120242 A1 * | 6/2005 | Mayer et al. | 713/201 |
| 2006/0131397 A1 * | 6/2006 | Reddy et al. | 235/380 |

FOREIGN PATENT DOCUMENTS

| | | |
|---|---|---|
| CN | 1540920 A | 10/2004 |
| WO | WO 98/19459 A1 | 5/1998 |
| WO | WO 02/45334 A1 | 6/2002 |
| WO | WO 02/079987 A1 | 10/2002 |
| WO | WO 03/065727 A1 | 8/2003 |
| WO | WO 03065727 A1 | 8/2003 |

OTHER PUBLICATIONS

Foreign communication from a counterpart application, EP application 06705505.3, Office Action dated Jun. 1, 2010, 8 pages.

Foreign communication from a counterpart application, Chinese application 2005100329128, dated Nov. 9, 2007, 35 pages.

* cited by examiner

METHOD AND SYSTEM FOR PROCESSING MULTICAST SERVICES

FIELD OF THE INVENTION

The present invention relates to multicast technologies, and more particularly, to a method and a system for processing multicast services based on the Internet.

BACKGROUND OF THE INVENTION

With the development of broadband services and the variety of demand of users, the users are not satisfied with traditional Internet services such as webpage browsing or file downloading any longer, and the demand of the users for Video on Demand, remote education, stock information, video conference, etc. has grown rapidly. With the spread of multicast services, especially video services, demand for supporting functions and performance of the multicast services has been brought forward on devices. Furthermore, in order to compete with traditional broadcast and television networks, demand for faster, more secure, and more flexible operation on the multicast services have been brought forward in the Internet.

One of key technologies for processing the multicast services is a sending mode of service authority, that is, how an operator authorizes a terminal user to watch a video program or enjoys other services. The sending mode of service authority directly determines the flexibility of the multicast services and the form of providing the multicast services. A right suite mode is adopted in the conventional sending method of the multicast services, that is, terminal users in a region are divided into user groups with different watching demand, and the different user groups are provided with different templates so as to make the terminal users acquire services within scopes of their service authorities, respectively. The template is authority to watch a series of programs. For example, it is supposed that there are three channels, channel C1, channel C2 and channel C3, in a local system, while there are six users, i.e., users from U1 to U6 in a region. Three templates, i.e., template P1, template P2 and template P3, are set and the authority to watch channels in each of the templates is configured with the help of the analysis on the demand of the users. Here, template P1 has the authority to watch channel C1, template P2 has the authority to watch channel C1 and channel C2, while template P3 has the authority to watch channel C1, channel C2 and channel C3. In order to enable a user to watch a program, the user should be bound to one of the templates. For example, if user U1 is bound to template P1, user U1 only has the user authority to watch programs of channel C1; if user U1 is bound to template P3, the user authority of user U1 is to watch the programs of channel C1, channel C2 and channel C3.

At present, a multicast service processing system mainly includes two aspects of task in the course of multicast service processing: one is profile establishing and profile binding; the other is to authenticate user's authority of a program. To establish the template is to add authority of related program lists into a template list; to bind the template is to add related templates into a user list. Thus, association relation among the three lists, i.e., the user list, the template list and the program list, is built. To authenticate the authority of a program of a user is as follows: based on a source port and a multicast address carried in an Internet Group Management Protocol (IGMP) message from a user and through querying the association relation among the three lists, i.e., the user list, the template list and the program list, determining whether the user who belongs to the source port and the multicast address has the authority to watch a certain program, and transmitting corresponding program streams to the user that has the authority, otherwise, not transmitting the corresponding program streams.

There are following disadvantages in the conventional method mentioned above for processing multicast services.

In one aspect, user authority can not be configured flexibly. Since the user authority is configured using the template mode, the user may be bound to one of the templates or is not bound to any of the templates, that is, the user has no authority. In the above examples, if the user is only expected to watch the programs of channel C1 and channel C3, none of the existing three templates can meet the demand of the user authority and based on the conventional processing method, a new template must be generated to meet the demand. However, program sources are very rich in practical applications, it is impossible to completely enumerate all combinations of various program sources using different templates. Thus, the flexibility of configuring the user authority is limited.

In another aspect, means for processing the user authority of a superuser has relatively great limitation. The superuser refers to a user who need not to be authenticated the authority of a program of the user. Generally, in order to enable the superuser to watch programs, a template containing the authority of programs of all channels is generated in the conventional template configuration mode and the template is bound to the superuser. The method achieves the use of the superuser to some extent, but in fact, the superuser is dealt with as a super ordinary user, which is shown in the following aspects: first, when a program source is added, the templates of all the superusers need to be revised, and thus a null configuration and instant availability for superusers cannot be achieved; second, since it is unable to distinguish the superuser from an ordinary user on a system side, stream classification and priority processing for the superuser cannot be implemented; third, the authority of a program of a certain user cannot be revised separately, while the revision to the template may affect all the users bound to the template.

To sum up, since the user authority is configured through binding of the template and the user, the authority of a program cannot be added or deleted for a single user, which greatly limits the flexibility of the processing of multicast services. The revision to the template to which a certain user is bound may inevitably influence authority of all users that are bound to the template, and have an impact on individualized services for users.

SUMMARY

In view of the above, the present invention provides a method for processing multicast services which may improve the flexibility of multicast service processing and achieve individualized services for users.

The present invention provides a multicast service processing system which may improve the flexibility of multicast service processing and achieve individualized services for users.

The technical solutions of the present invention are implemented as follows.

A method for processing multicast services includes:

querying a default template and a right suite template based on a request for playing a program received from a user, determining whether the user has authority of the program, wherein the default template is a template for separately configuring the authority of programs for the user, the right suite template is a template which prefabricates combination of programs and authority;

forwarding the program if the user has the authority of the program.

A method for processing multicast services includes:

binding more than one right suite template to a user, querying the right suite templates based on a request for playing a program received from the user, overlapping authority of a program in each of more than one right suite template, obtaining final authority of the program, and determining whether the user has the authority of the program according the final authority;

forwarding the program if the user has the authority of the program.

A multicast service processing system includes:

a user template module, for saving a default template for separately configuring authority of programs and a right suite template which prefabricates combination of programs and authority;

a program list module, for saving a program stream;

a controlled multicast module, for receiving user's program playing information carried in a request for playing a program from a user, traversing the user template module, determining the authority of a program, and forwarding the program stream saved in the program list module when the user has the authority of the program.

In the system and method for processing the multicast services provided by the present invention, flexible solutions for configuring the authority of the multicast user are provided, and more effective and flexible authority sending modes are also provided to an operator of the multicast services by adopting the right suite mode and the individualization mode in combination. Thus, the flexibility of processing the multicast services is improved and the individualized services are achieved. In the present invention, a user can be bound to multiple templates, and richer authority sending modes for configuring the authority of the multicast user are provided. In addition, the present invention also proposes a processing mode for superuser, which provides the superuser with highly efficient and convenient privilege processing which will not be influenced by adding of a service.

DETAILED DESCRIPTION OF THE INVENTION

The present invention is hereinafter further described in detail with reference to the drawings and preferred embodiments to further clarify the objective, technical solutions and advantages of the present invention.

Figure 1:
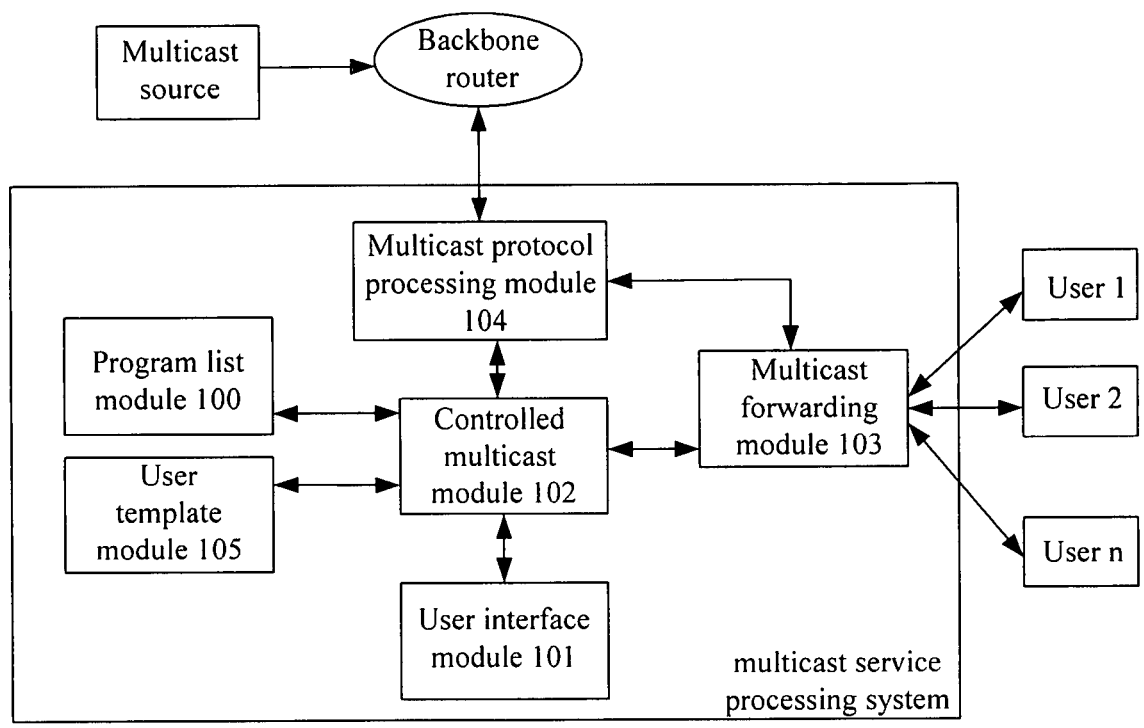
FIG. 1 shows a schematic diagram illustrating composing structure of a multicast service processing system according to the present invention.

FIG. 1 shows a schematic diagram illustrating composing structure of a multicast service processing system according to the present invention. As shown in FIG. 1, the multicast service processing system in the present invention includes a user interface module 101, a controlled multicast module 102, a multicast forwarding module 103, a multicast protocol processing module 104, a user template module 105 and a program list module 100. The multicast service processing system in the present invention may be a separate entity or be set in a Digital Subscriber Line Access Multiplexer (DSLAM).

The user interface module 101 is used for managing user information in the multicast service processing system, receiving user's program playing information from the controlled multicast module 102 in a process of requesting for playing a program, and translating the received user's program playing information into internal information which can be recognized in the multicast service processing system and sending the internal information to the controlled multicast module 102.

The controlled multicast module 102 is used for receiving the user's program playing information from the multicast forwarding module 103 and sending the information to the user interface module 101, receiving the internal information from the user interface module 101 and traversing templates to which the user is bound in the user template module 105 based on the internal information so as to acquire authority of the program requested by the user. If the controlled multicast module 102 has received the program stream via a backbone router, sends a program stream saved in the program list module 100 to the multicast forwarding module 103. If the controlled multicast module 102 has not received the program stream via the backbone router, notifies the multicast forwarding module 103 to forward an IGMP report message to the multicast protocol processing module 104.

The multicast forwarding module 103 is used for receiving the IGMP report message from the user, analyzing the IGMP report message to acquire the user's program playing information, such as a program requested by the user and a user identifier, sending the information to the controlled multicast module 102, receiving the program stream from the controlled multicast module 102 and forwarding the program stream to the user. When receiving a notification of forwarding the IGMP report message from the controlled multicast module 102, the multicast forwarding module 103 forwards the received IGMP report message to the multicast protocol processing module 104.

The multicast protocol processing module 104 is used for performing protocol conversion on information interacted between the multicast service processing system and a backbone router.

The user template module 105 is used for saving a default template and a right suite template to which a user is bound. The user template module 105 is used for saving at least one of a default template for separately configuring authority of programs for a user and right suite templates which prefabricate combination of programs and authority to which the user is bound. The default template records individual configuration information of the user and each user may change the default template which belongs to him or her. The right suite template is a packed combination service provided by an operator. The operator may provide multiple right suites and each user may select one or more of the right suites. In this case, not only a default template for meeting individual demand that the right suite service cannot meet is bound to the user in the user template module 105, but also multiple right suite templates are bound to the user, as well.

The program list module 100 is used for saving the program stream. Passing by the backbone router, the program stream is translated into the program stream which accords with the protocol of the multicast service processing system after the conversion of the protocol of the multicast protocol processing module 104, and is saved into the program list module 100 under the control of the controlled multicast module 102.

Figure 3:
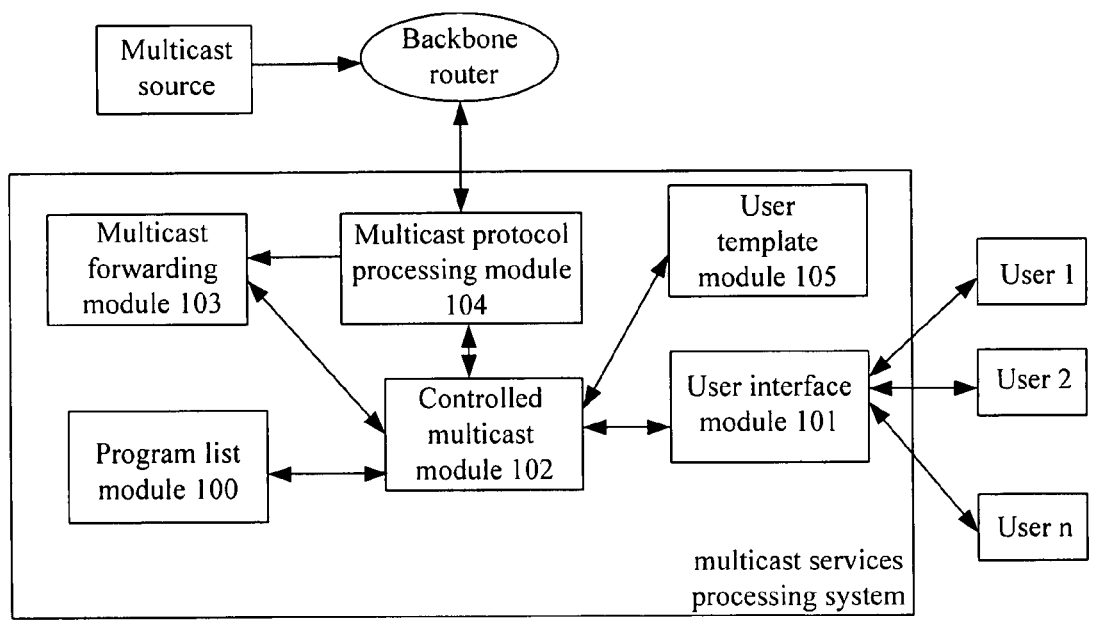
FIG. 3 shows a schematic diagram illustrating another composing structure of the multicast service processing system according to the present invention.

FIG. 3 shows a schematic diagram illustrating another composing structure of the multicast service processing system according to the present invention. As shown in FIG. 3, the multicast service processing system includes the user interface module 101, the controlled multicast module 102, the multicast forwarding module 103, the multicast protocol processing module 104 and the user template module 105.

The user template module 105 is used for saving at least one of a default template for separately configuring the authority of programs for a user and right suite templates which prefabricate combination of programs and authority to which the user is bound. The default template records the individual configuration information of the user and each user may arbitrarily change the default template which belongs to him. The right suite template is the packed combination service provided by the operator. The operator may provide multiple right suites and each user may select one or more of the right suites. In this case, in the user template module 105, not only the default template for meeting the individual demand that the right suite service cannot meet is bound to the user, but also multiple right suite templates are bound to the user, as well.

After receiving the program requested by the user and the user identifier, the multicast service processing system shown in FIG. 3 performs the processes as follows. The user interface module 101 sends the program requested by the user and the user identifier to the controlled multicast module 102. The controlled multicast module 102 traverses all templates with the user identifier to which the user is bound in the user template module 105 to acquire the authority of the program. If the user does not have watching authority, the multicast forwarding module 103 does not forward any program stream; if the user has the authority of the program and the program stream has been forwarded to the multicast service processing system, the multicast forwarding module 103 directly forwards the program stream to the user; if the user has the authority of the program and the program stream has not been forwarded to the multicast service processing system, the multicast forwarding module 103 sends an IGMP report message to a router of an upper layer via the multicast protocol processing module 104 to request the router to forward the program requested by the user.

Figure 2:
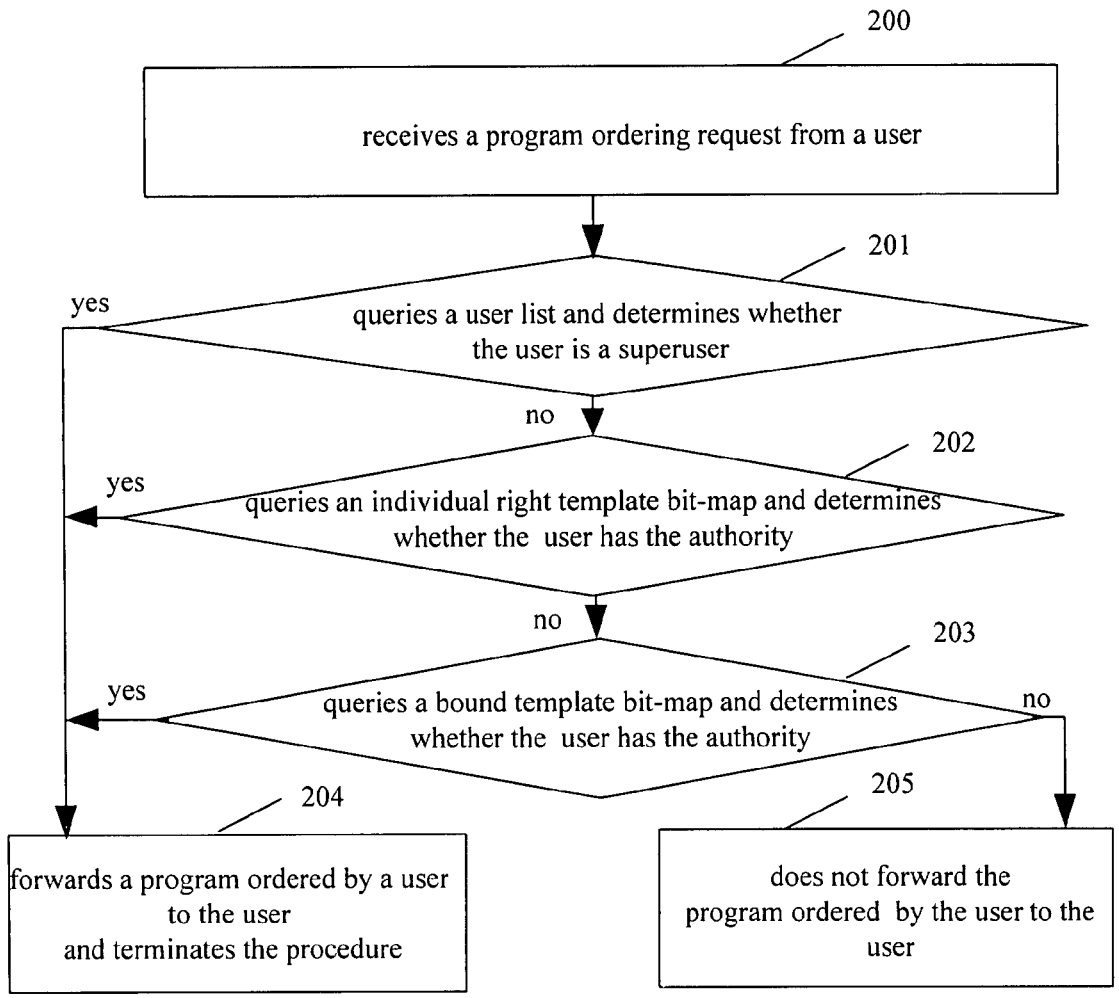
FIG. 2 shows a flow chart of a method for processing multicast services according to the present invention.

FIG. 2 shows a flow chart of a method for processing multicast services according to the present invention. As shown in FIG. 2, it is supposed that various templates have been built, that is, authority of related program lists have been added into a template list, and binding of the templates has been completed, that is, related templates are added into a user list and binding of users is set, in other words, each of the users has been bound to at least one of a default template for separately configuring authority of programs for the user and a right suite template which prefabricates combination of programs and authority. The method for processing the multicast services according to the present invention includes the processes as follows.

In Blocks 200~201, after receiving a request for playing a program from a user, the multicast service processing system queries the user list, and determines, based on a user data structure of the user who sends the request for playing a program, whether the user is a superuser. If the user is the superuser, proceeds to Block 204, otherwise, proceeds to Block 202.

Data structures carried in the request for playing a program in the embodiment mainly include three types of data structure, a user data structure, a template data structure and a program data structure, which are specifically described as follows.

The user data structure includes four fields, a user identifier, a privilege identifier, an individual right template bit-map and a bound template bit-map. The user identifier is used for identifying a user in the system uniquely; the privilege identifier is used for indicating whether the user is the superuser; the individual right template bit-map is used for saving individual authority, that is a default template, of a program of the user; the bound template bit-map is used for saving a corresponding right suite template to which the user is bound.

The template data structure includes three fields, a template index, a template name and a program bit-map. The template index is used for identifying a template in the system uniquely; the template name is a significative name for a template; the program bit-map is used for saving programs of which the template has the authority.

The program data structure includes three fields, a program index, a program name and a program IP address. The program index is used for identifying a program in the system uniquely; the program name is a significative name for a program; the program IP address saves a multicast IP address corresponding to the program.

The template data structure and the user data structure call the program data structure through the program bit-map and the individual right template bit-map, respectively; and the user data structure calls the template data structure through the bound template bit-map.

In Blocks 200~201, the user is determined to be the superuser if the privilege identifier in the user data structure indicates that the user is the superuser or there is a tag indicating that the user is the superuser, otherwise the user is not determined to be the superuser.

In Block 202, the individual right template, that is, the default template is queried through the individual right template bit-map in the user data structure, and if the program list in the individual right template indicates that the user has the authority of the program requested by the user, Block 204 is performed, otherwise, Block 203 is performed.

In this process, if the program bit-map in the individual right template indicates that the user has the authority of the program requested by the user, the program is requested for the user in an individualized mode. The individualized mode means playing programs of which the user has authority based on the default template. Here the default template separately configures the authority of a program for the user.

In Block 203, the bound template bit-map in the user data structure of the user is queried, if it is found in the bound template bit-map that the user has the authority of the program, Block 204 is performed, otherwise, Block 205 is performed.

In this process, if it is found in the bound template bit-map that the user has the authority of the program requested by the user, the program is requested for the user based on the right suite mode. The right suite mode plays programs of which the user has authority based on the right suite template which prefabricates combination of programs and authority.

It noted that in the present invention, it may also be determined first whether the user has the authority of the program requested by the user in the program list of the right suite template, and if the user has the authority, the multicast service processing system forwards the program to the user; otherwise, it is further determined whether the user has the authority of the program requested by the user in the program list of the default template. If the user has the authority of the program requested by the user in the program list of the default template, the multicast service processing system forwards the program requested by the user, otherwise, the multicast service processing system does not forward the program requested by the user.

In Block 204, the multicast service processing system forwards the program requested by the user and the procedure is terminated.

It is supposed herein that the program stream has been forwarded to the multicast service processing system beforehand.

If the program stream has not been forwarded to the multicast service processing system, before the program stream is forwarded in Block 204, the method further includes the processes of: the multicast service processing system requests a backbone router to forward the program requested by the user.

In Block 205, the multicast service processing system does not forward the program requested by the user.

A controlled process of requesting for playing a program based on a right suite mode or an individualized mode and a processing to a superuser are respectively described with reference to FIG. 1 as follows.

(1) The controlled process of requesting for playing a program based on the right suite mode.

The multicast forwarding module 103 acquires a program requested by a user and a user identifier from an IGMP report message from the user, and sends the program requested by the user and the user identifier to the controlled multicast module 102. The controlled multicast module 102 traverses templates to which the user is bound in the user interface module 101 and the user template module 105. Here, the user may be bound to one or multiple templates at the same time. The controlled multicast module 102 obtains authority types of the program from the user template module 105 and acquires final authority of the program requested by the user by comparing the authority multiple times. The multiple times means reading the templates multiple times so as to read the templates completely when the user is bound to multiple templates. Since each template may have different authority of a program, such as previewing the program, watching the whole program, watching a part of the program, the final authority of the program of the user is an overlap of the authority in all templates. For a program requested by a user, if the acquired final authority is authority that the user is not allowed to watch the program, the program stream is not to be forwarded to the user. If the final authority of the user is the authority that the user has the authority of the program and the program stream has been forwarded to the multicast service processing system, the multicast forwarding module 103 directly forwards the program stream to the user. If the program stream has not been forwarded to the multicast service processing system, the multicast forwarding module 103 forwards, under the control of the controlled multicast module 102, the IGMP report message to a backbone router through the multicast protocol processing module 104, and requesting the backbone router to forward the program requested by the user.

The final authority acquired through an overlap of authority is hereinafter explained with an example. It is supposed that template P1 has authority of program C1 and program C2, the authority of program C1 is watching a whole program, while the authority of program C2 is previewing the program, template P2 has the authority of program C1 and the authority of program C1 is previewing the program. The level of the authority to preview the program is lower than that of watching the whole program, and the system sets that the authority with a lower level is taken as the final authority after the overlap. If the user requests for playing program C1, the system queries templates P1 and P2 to which the user is bound, and acquires authority of program C1 of the user, that is, watching the whole program and previewing the program. In this case, the final authority of program C1 is previewing the program since system sets that the final authority after the overlap is the authority with a lower level.

It is easily concluded that the final authority of program C1 of the user is watching the whole program if the system sets that the final authority after the overlap is the authority with a higher level.

(2) The controlled process of requesting for playing a program based on the individualized mode The multicast forwarding module 103 acquires a program requested by a user and a user identifier from an IGMP report message from the user and sends the program requested by the user and the user identifier to the controlled multicast module 102. The controlled multicast module 102 traverses program lists to which the user is bound in the user interface module 101 and the user template module 105 so as to acquire authority type of the program. If the user does not have the authority to watch, the program stream is not to be forwarded to the user. If the user has the authority of the program and the program stream has been forwarded to the multicast service processing system, the program stream is directly forwarded to the port of the user by the multicast forwarding module 103. If the program stream has not been forwarded to the multicast service processing system, the IGMP report message is forwarded by the multicast forwarding module 103, under the control of the controlled multicast module 102, to a backbone router through the multicast protocol processing module 104 to request the backbone router to forward the program requested by the user.

The controlled process of the individualized mode differs from that of the right suite mode in that the two processes for acquiring the authority of a program are different.

As can be seen from the multicast service processing system in the present invention, as well as the controlled process of requesting for playing a program based on at least one of the right suite mode and the individualized mode, there are one or more right suite templates and one default template in the user template module 105 at the same time, which are uniformly dealt with as a template. Thus, the coexistence of the right suite service and the individualized service is achieved. In other words, the right suite setting and the individualized setting of the multicast services are achieved simultaneously in a same multicast service processing system in the present invention via two aspects mentioned in the following.

One aspect is setting of list items and templates. In the conventional method, a user may only be bound to a certain specific template, and the user must be newly bound to another template if the user wants to change his/her template. However, in the present invention, a method of binding a user to multiple templates is adopted, that is, the user may be bound to arbitrary number of templates. One of templates is a default template bound to the user in a default setting mode, and the default template is used for providing individualized setting of the user to improve the flexibility of service configuration. Here, the above mentioned example is employed for describing how to restrict a certain user to watch only the programs of channel C1 and channel C3. In the case that there are only three templates, for example template P1 has the authority to watch channel C1, template P2 has the authority to watch channel C1 and channel C2, and template P3 has the authority to watch channel C1, channel C2 and channel C3. With the solution of the present invention, when the user is bound to templates, the user may be bound to template P1 first and then the authority to watch programs of channel C3 is bound in the default template. The default template is invisible to the user and behaves as the setting of individual properties.

The other aspect is that the controlled process of requesting for playing a program is the same as a traditional process, and the difference is that the default template is invisible to a user, since the default template recording the setting of individual properties is still a template for the system. Thus, if the type of the authority of a certain program of the user is to be inquired during the controlled process of requesting for playing a program, all the templates to which the user is bound are traversed so as to find the highest authority of the program which is regarded as the basis for forwarding the program stream.

(3) The Method of Processing a Superuser

Taking the convenience of user configuration into consideration, a superuser is identified with a special identifier and is not dealt with as a super ordinary user. Thus, the superuser need not to be bound to a template which has all authority or be granted the authority of all the programs. Moreover, the multicast service processing system may perform special processing, such as a flow control and priority process, for the superuser. For the superuser, a special marker is set in the user identifier. Thus, after receiving an IGMP report message carrying the program requested by the user and the user identifier which carries the special identifier, the multicast service processing system directly determines, based on the special identifier, whether the program stream of the program requested by the user has been forwarded to itself, if the program stream of the program requested by the user has been forwarded to the multicast service processing system, the multicast forwarding module 103 directly forwards the program stream to the user, otherwise, the multicast forwarding module 103 forwards the IGMP report message to a router of an upper layer via the multicast protocol processing module 104 to request the router to forward the program requested by the user. In the procession mentioned above, procedure for acquiring and determining the authority need not to be performed. Thus, the superuser has a real privilege and is not influenced by the adding of a service.

It should be emphasized that the above-described embodiments, particularly, any 'preferred' embodiments, are merely possible examples of implementations, merely set forth for a clear understanding of the principles of the invention. Many variations and modifications may be made to the above-described preferred embodiments without departing substantially from the spirit and principles of the invention. All such modifications and variations are intended to be included herein within the scope of this disclosure and the above-described preferred embodiments and protected by the following claims.

The invention claimed is:

1. A method for processing multicast services, comprising:
querying one of a default template and a right suite template by a digital subscriber line access multiplexer (DSLAM) based on a request for playing a program received from a user, determining, by the DSLAM, whether the user has authority of the program, wherein the default template is a template for separately configuring the authority of programs for the user, the right suite template is a template which prefabricates combination of programs and authority;
forwarding the program, by the DSLAM, if the user has the authority of the program,
wherein the process of determining whether the user has the authority of the program comprises: querying one of the default template and the right suite template with the user identifier to acquire authority of the program requested by the user; and determining whether the user has the authority of the program,
wherein the request comprises a user data structure, a template data structure, and a program data structure,
wherein the user data structure comprises a user identifier, a privilege identifier, an individual right template bit-map, and a bound template bit-map,
wherein the privilege identifier indicates whether the user is a superuser, the individual right template bit-map is configured to save the default template, and the bound template bit-map is configured to save the corresponding right suite template, and
wherein the individual right template bit-map is used for calling the program data structure. and the bound template bit-map is used for calling the template data structure.

2. The method of claim 1, wherein the process of determining whether the user has the authority of the program further comprises:
when the user is determined not to have the authority of the program according to a result of the querying one of the default template and the right suite template, querying the other one of the default template and the right suite template with the user identifier;
determining whether the user has the authority of the program according to a result of querying the other one of the default template and the right suite template.

3. The method of claim 1, further comprising:
determining whether the user is a superuser, and forwarding the program when the user is determined to be the superuser.

4. The method of claim 3,
wherein the template data structure comprises: a template index for uniquely identifying a template, a template name, and a program bit-map for saving programs of which the template has the authority, and
wherein the program data structure comprises: a program index for uniquely identifying a program, a program name, and a program IP address for saving a multicast address of the program.

5. The method of claim 1, wherein the process of determining whether the user is the superuser comprises:
determining whether the privilege identifier indicates that the user is the superuser, taking the user as the superuser if the privilege identifier indicates that the user is the superuser.

6. The method of claim 4, wherein the process of determining whether the user has the authority of the program in the default template comprises:
querying the default template of the user through the individual right template bit-map in the user data structure of the user, determining that the user has the authority of the program in the program list of the default template if the program list of the default template indicates that the user has the authority of the program.

7. The method of claim 4, wherein the process of determining whether the user has the authority of the program in the right suite template comprises:
querying the bound template bit-map in the user data structure of the user, determining that the user has the authority of the program in the program list of the right suite template if it is found in the bound template bit-map that the user has the authority of the program.

8. The method of claim 7, wherein the process of determining whether the user has the authority of the program in the right suite template comprises: binding more than one right suite template to the user, overlapping the authority in each of more than one right suite template, acquiring final authority of the program of the user, and determines whether the user has the authority of the program according the final authority.

9. A digital subscriber line access multiplexer (DSLAM), comprising:
- a user template module, configured to save, in a computer memory, a default template for separately configuring authority of programs and a right suite template which prefabricates combination of programs and authority;
- a program list module configured to save a program stream;
- a controlled multicast module configured to receive a user's program playing information carried in a request for playing a program from a user, traverse the user template module, determine the authority of a program, and forward the program stream saved in the program list module when the user has the authority of the program,
- wherein the request comprises a user data structure, a template data structure, and a program data structure,
- wherein the user data structure comprises a user identifier for uniquely identifying the user, an individual right template bit-map for saving individual authority of a program, and a bound template bit-map for saving the right suite template,
- wherein the template data structure comprises a template index for uniquely identifying a template, a template name, and a program bit-map for saving programs in which the template has the authority to save,
- wherein the program data structure comprises a program index, a program name, and a program IP address for saving a multicast address of the program,
- wherein the individual right template bit-map is used for calling the program data structure,
- wherein the bound template bit-map is used for calling the template data structure, and
- wherein the process of determining whether the user has the authority of the program comprises: querying one of the default template and the right suite template with the user identifier to acquire authority of the program requested by the user; and determining whether the user has the authority of the program.

10. The DSLAM of claim 9, further comprising:
a multicast forwarding module configured to receive the request for playing a program from the user, acquire the user's program playing information, forward the user's program playing information to the controlled multicast module, receive the program stream from the controlled multicast module, and forward the program stream to the user.

11. The DSLAM of claim 9, further comprising:
a multicast protocol processing module, configured to perform protocol conversion on information interacted between the DSLAM and a backbone router.

12. The DSLAM of claim 9, further comprising:
a user interface module, configured to manage information of users in the DSLAM, receive the user's program playing information from the controlled multicast module, translate the user's program playing information into internal information recognizable in the DSLAM, and forward the internal information to the controlled multicast module.

13. The DSLAM of claim 9, wherein the default template is used for recording individual configuration information of the user; and
wherein the user selects one or more right suite services.

14. The DSLAM of claim 9, further comprising:
- a multicast forwarding module, configured to forward the program stream to a user interface module;
- the user interface module, configured to receive the request for playing a program from the user, acquire the user's program playing information, forward the user's program playing information to the controlled multicast module, and send the program stream from the multicast forwarding module to the user.

15. The DSLAM of claim 14, further comprising:
a multicast protocol processing module, configured to perform protocol conversion on information interacted between the DSLAM and a backbone router.

16. The DSLAM of claim 15, wherein the user interface module is used for transferring the program and a user identifier to the controlled multicast module,
wherein the controlled multicast module is used for traversing all templates with the user identifier to which the user is bound, and acquiring the authority of the program,
wherein the multicast forwarding module is used for directly forwarding the program stream to the user interface module if the user has the authority of the program and the program stream has been forwarded to the DSLAM, and
wherein the multicast protocol processing module is used for sending an Internet Group Management Protocol (IGMP) report message to a router of an upper layer, and requesting the router of the upper layer to forward the program if the user has the authority of the program and the program stream has not been forwarded to the DSLAM.

* * * * *